(12) United States Patent  (10) Patent No.: US 8,326,087 B2
Perronnin et al.  (45) Date of Patent: Dec. 4, 2012

(54) SYNCHRONIZING IMAGE SEQUENCES

(75) Inventors: Florent Perronnin, Domene (FR);
Claudio Cifarelli, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1044 days.

(21) Appl. No.: 12/277,779

(22) Filed: Nov. 25, 2008

(65) Prior Publication Data

US 2010/0128919 A1 May 27, 2010

(51) Int. Cl.
*G06K 9/32* (2006.01)
*G06K 9/36* (2006.01)
*H04N 9/475* (2006.01)

(52) U.S. Cl. .................... 382/294; 382/284; 348/513

(58) Field of Classification Search .................. 382/294, 382/284; 348/513
See application file for complete search history.

(56) References Cited

U.S. PATENT DOCUMENTS

| | | | | | |
|---|---|---|---|---|---|
| 4,448,200 | A | * | 5/1984 | Brooks et al. | 600/425 |
| 5,675,665 | A | * | 10/1997 | Lyon | 382/229 |
| 6,256,418 | B1 | | 7/2001 | Rehg et al. | |
| 6,259,477 | B1 | * | 7/2001 | Hu | 348/180 |
| 6,320,624 | B1 | * | 11/2001 | Ayer et al. | 348/584 |
| 6,340,991 | B1 | * | 1/2002 | Chen et al. | 348/513 |
| 6,675,174 | B1 | * | 1/2004 | Bolle et al. | 1/1 |
| 7,133,066 | B2 | * | 11/2006 | Bourret | 348/180 |
| 7,486,827 | B2 | * | 2/2009 | Kim | 382/209 |
| 7,885,794 | B2 | | 2/2011 | Liu et al. | |
| 2002/0028021 | A1 | * | 3/2002 | Foote et al. | 382/224 |
| 2004/0071367 | A1 | * | 4/2004 | Irani et al. | 382/284 |
| 2005/0128313 | A1 | * | 6/2005 | Kobayashi | 348/222.1 |
| 2005/0128318 | A1 | * | 6/2005 | Leow et al. | 348/231.5 |
| 2005/0281536 | A1 | * | 12/2005 | Aiso et al. | 386/69 |
| 2006/0200475 | A1 | | 9/2006 | Das et al. | |
| 2007/0097266 | A1 | * | 5/2007 | Souchard | 348/571 |
| 2007/0279494 | A1 | * | 12/2007 | Aman et al. | 348/169 |
| 2008/0211941 | A1 | * | 9/2008 | Deever et al. | 348/262 |
| 2008/0253689 | A1 | * | 10/2008 | Ferguson | 382/294 |
| 2009/0022472 | A1 | * | 1/2009 | Bronstein et al. | 386/52 |
| 2009/0213245 | A1 | * | 8/2009 | Harper et al. | 348/231.3 |
| 2009/0271433 | A1 | | 10/2009 | Perronnin et al. | |
| 2010/0005488 | A1 | * | 1/2010 | Rakib et al. | 725/34 |
| 2010/0008643 | A1 | * | 1/2010 | Rakib et al. | 386/68 |

(Continued)

FOREIGN PATENT DOCUMENTS

GB 2262680 6/1993

(Continued)

OTHER PUBLICATIONS

"A Media Synchronization Survey: Reference Model, Specification, and Case Studies," Gerold Blakowski, et al, IEEE Journal on Selected Areas in Communications, vol. 14, No. 1, Jan. 1996, pp. 5-35.*

(Continued)

*Primary Examiner* — Wenpeng Chen
(74) *Attorney, Agent, or Firm* — Fay Sharpe LLP

(57) ABSTRACT

As set forth herein, a computer-based method is employed to align a sequences of images. Metadata associated with images from two or more sources is received and a time stamp is extracted from the metadata. The images are sorted into sequences based at least in part upon the image source. The similarity of images from disparate sequences is measured and image pairs from disparate sequences with a similarity greater than a predetermined threshold are identified. A sequence of images is aligned by minimizing the misalignment of pairs.

20 Claims, 5 Drawing Sheets

U.S. PATENT DOCUMENTS

2010/0066759 A1* 3/2010 Zhang .......................... 345/620

FOREIGN PATENT DOCUMENTS

| | | |
|---|---|---|
| JP | 2006140559 A * | 6/2006 |
| WO | WO9318483 | 9/1993 |
| WO | WO9713247 | 4/1997 |
| WO | WO9742560 | 11/1997 |
| WO | WO2006/105094 | 10/2006 |

OTHER PUBLICATIONS

Breeze Systems Support, Synchronizing the time when using multiple cameras, http://www.breezesys.com/articles/multiple_cameras.htm; accessed Oct. 7, 2008, 6 pgs.

* cited by examiner

SYNCHRONIZING IMAGE SEQUENCES

BACKGROUND

The present exemplary embodiments broadly relate to synchronizing images from a plurality of disparate sources. They find particular application in conjunction with the identification of similar images to minimize misalignment of sequences. In one embodiment, a cost function is utilized to properly align a sequence of images. However, it is to be appreciated that the present exemplary embodiments are also amenable to other like applications.

Images can be captured during an event via cameras, cell phones, PDAs, or other means. Organizing captured images in a proper sequence can be difficult as angles, lighting, subjects, etc. can vary from image-to-image and from camera-to-camera. This problem can be exacerbated when time of capture is unknown. In order to overcome such difficulties, metadata can be analyzed to determine a time stamp associated with each image. This information, however, relies upon external settings that can be inaccurate. For example, the time stamp may rely upon a user setting a current time/date. Such setting can be unreliable if it is not updated to a current time zone, daylight savings, etc. As a result, the time line or sequence of image capture can be incomplete and/or erroneous.

Conventionally, the synchronization of multiple cameras is achieved in a professional environment by linking all cameras to a single computer that sends synchronization signals. However, all cameras are rarely available to one person and rarer still to a person that has computer software for image synchronization. Additionally, there is a large body of scientific work on video alignment. The assumption is that two (or more) cameras take different shots of the same object/scene and thus that the videos may be aligned frame-by-frame. Only a few images in each sequence of photos typically correspond to the same object/scene. Hence, typical video alignment algorithms cannot be applied.

Other approaches have been taken to try and identify proper sequencing of camera images. One approach is described by Breeze Systems in an online article at http://www.breezesys.com/articles/multiple_cameras.htm. It consists of taking a shot of the same clock using each camera to provide a reference time (this can be before, during or after the event). This is only possible if one person has access to all cameras, which is difficult, if not impossible, as noted above.

Another approach is described in US Patent Publication No. 2006/0200475 assigned to Eastman Kodak. This application is directed to a method for combining a plurality of new images into an existing database of chronologically ordered images. The database images are classified into event groups based upon a time difference threshold, and within event groups into event subgroups based upon a similarity measure. First, one or more image features of each of the new images is assessed. Next, the new images are ordered into clusters based upon the image features and a representative image in each of said clusters is selected. A segment of said database images is designated that chronologically overlaps the new images. In the segment, a set of one or more of said database images similar to each of said representative images to provide sets of retrieved images is identified. Different event subgroups are associated including one or more of said retrieved images with each of said clusters to provide matched subgroups. The new images are assigned to the matched subgroups associated with the respective clusters.

There are several shortcomings, however, associated with this approach. First, new images are assigned to image clusters within a database. Thus, the problem of synchronizing image sequences taken by multiple cameras is not addressed. Second, an assumption is made that a database of chronologically ordered images pre-exists. This ordering does not exist when images are gathered from disparate sources and thus is not applicable to aid in sequencing such images. Lastly, a further assumption is made that all images (e.g., database images and new images) are synchronized. Again, such synchronization does not exist with images from multiple sources.

Accordingly, there is a need for systems and methods to synchronize images taken from a plurality of sources with little or no temporal knowledge regarding the same.

BRIEF DESCRIPTION

In one aspect, a computer-based method is employed to align a sequence of images. Metadata associated with images from two or more sources is received and a time stamp is extracted from the metadata. The images are sorted into sequences based at least in part upon the image source. The similarity of images from disparate sequences is measured and image pairs from disparate sequences with a similarity greater than a predetermined threshold are identified. A sequence of images is aligned by minimizing the misalignment of pairs.

In another aspect, a computer based method is utilized to align a sequence of images. Metadata associated with images from two or more sources is received. The images are sorted into sequences based at least in part upon the image source. The similarity of images from disparate sequences is measured wherein clusters are identified based at least in part upon the image similarity. A sequence of images is aligned by maximizing the global concentration of clusters.

In yet another aspect, a system aligns a sequence of images. A plurality of image capturing devices are used to capture an image. A time stamp extractor extracts a time stamp associated with each image from each of the one or more image capturing devices. A sequence sorter sorts the sequence of images associated with each image capturing device. A measuring component measures the similarity of each of the images from disparate sequences. A pair/cluster evaluator evaluates the similarity of pairs and/or clusters of images to verify that the similarity is greater than a predetermined threshold. A sequence alignment component utilizes similarity information to minimize misalignment of images to provide an appropriate sequence alignment.

DETAILED DESCRIPTION

In describing the various embodiments of the control system, like elements of each embodiment are described through the use of the same or similar reference numbers.

As discussed herein, it is to be understood that the content of the images is utilized to align N number sequences of images taken by N different images capturing devices (e.g. cameras). One assumption is that similar pictures are taken by different cameras at approximately the same time. Such an assumption is more likely to be true when the number of cameras involved in the event and the number of photos taken increases. In this manner, an appropriate sequence of images can be ascertained and presented to a user utilizing an appropriate cost function or other objective function based on the similarity of such images.

Figure 1:
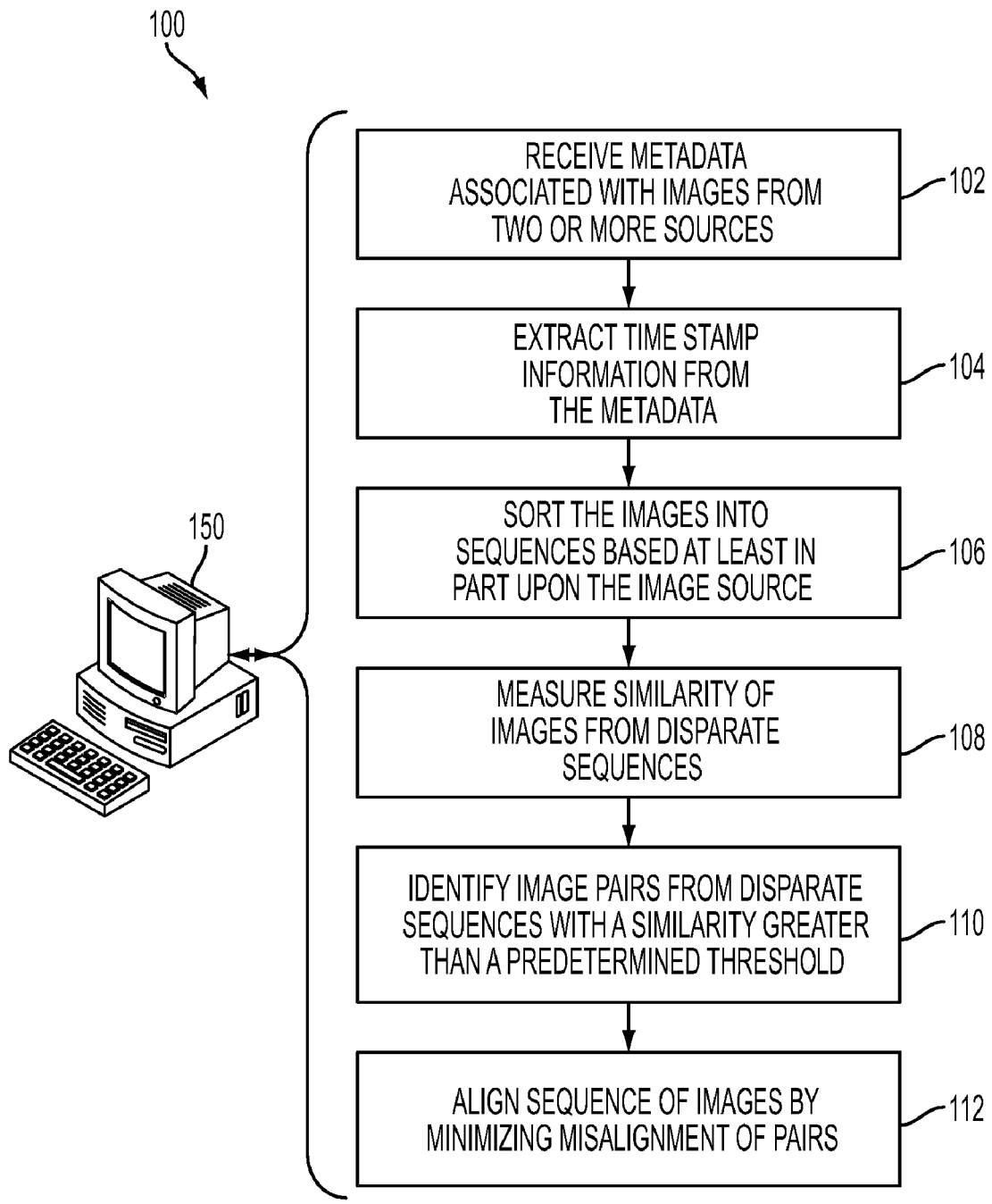
FIG. 1 illustrates a method to align a sequence of images by minimizing a misalignment of pairs, in accordance with an aspect of the subject embodiment.

FIG. 1 illustrates a methodology 100 that is employed to align a sequence of images. At reference numeral 102, metadata is received that is associated with images from two or more sources. In one embodiment, the sources are digital image capturing devices such as a camera, a cell phone, a personal digital assistant (PDA), etc. The metadata associated therewith can be in substantially any format such as an exchangeable image file format (Exif), for example. As known, Exif is a specification for image file formatting used by digital cameras. The specification can utilize existing JPEG, TIFF Rev. 6.0, and RIFF WAV file formats, with the addition of specific metadata tags. In this manner, date and time information is recorded by the digital image capturing device and saved with the metadata. This Exif data is embedded within the image file itself.

At 104, a time stamp is extracted from the metadata for each image. Such extraction can be facilitated utilizing standard software applications that are known in the art. In one example, the software application identifies the date and time field within the Exif header and extracts the numerical representation from the value field associated therewith. At 106, the images are sorted into sequences based at least in part upon the image source. Again, the Exif header can be polled to extract information related to the digital image capturing device such as the model, manufacturer, etc. in order to ascertain the image sequencing associated therewith. Alternatively, or in addition, a user can organize the images based upon known parameters, such as the camera owner's identity.

At 108, the similarity of images from disparate sequences is measured. Substantially any known tool can be used to measure the similarity between two images. In this manner, all pairs of images which belong to two different sequences and meet a predetermined threshold can be detected. One method to detect image similarity is described in U.S. patent application Ser. No. 11/947,859 entitled "Adapted Mixture Models for Image Retrieval and Categorization." It is to be appreciated that substantially any measurement tool can be employed to ascertain image similarity with the embodiments described herein.

At 110, image pairs from disparate sequences are identified that have a similarity greater than a predetermined threshold. Utilizing the similarity measurement from reference numeral 108, a similarity score can be generated for each image pair. If this score is greater than some predefined threshold, one image can be associated with another. If an image is not paired with another (e.g., there is no associated image score greater than the predetermined threshold), the image is no longer considered under the method 100. In one example, let P be the set of pairs: $P=\{p_i, i=1 \ldots M\}$. There is an assumption that each sequence has at least one image paired with another image in another sequence (which imposes $M \geq N-1$). Each pair $p_i$ contains an "image 1" and an "image 2" and is characterized by the time stamps of the images (respectively $t_{i,1}$ and $t_{i,2}$) and the index of corresponding sequences (respectively $S_{i,1}$ and $S_{i,2}$).

One goal is to associate images in different sequences which correspond to the same absolute time of the event. Utilizing the image similarity may associate photos which are visually very similar but which correspond to different times of the event. Let us take the example of a dinner. Two different persons may take the picture of the same table with the same persons, one during the first course, and the other during dessert (which may be separated by more than 1 hour). While the image may contain cues indicating that the two photos do not correspond to the same time (dishes on the table), they may be too subtle to be identified by state-of-the-art image similarity systems. Therefore, in one embodiment, a user can validate similar images detected by the system.

In another example, a confidence measure can be associated with each pair. In this case, each pair $p_i$ can have an associated value $\omega_i$ which indicates the confidence regarding whether the two photos correspond to the same time. Such a confidence measure can be based on the measure of similarity between images and/or on the fact that the pairs of images has been validated or not validated by a user. In the case where a confidence measure is not associated with image pairs, an assumption can be made that all values are equal to 1 or some other equivalent.

At 112, the sequence of images is aligned by minimizing the misalignment of pairs. First, an image sequence is chosen arbitrarily as a reference sequence. The reference is denoted $S_0$. An assumption is made that the N−1 remaining sequences (denoted $S_n$, n=1 ... N−1) are shifted by a time $\delta(n)$ from the reference ($\delta(0)=0$ by definition). The following cost function is minimized:

$$C = \frac{1}{M} \sum_{i=1}^{M} \omega_i C_i \text{ with } C_i = [(t_{i,1} - \delta(s_{i,1})) - (t_{i,2} - \delta(s_{i,2}))]^2 \quad (1)$$

which represents the average squared misalignment of the pairs of images. Taking the partial derivatives with respect to $\delta$'s and equating to zero leads to a system of N−1 linear equations with N−1 unknowns. If this system has a unique solution, then a candidate alignment is found. Utilizing the computed $\delta$ values, one can compute the value of the cost function C. If C is below a predefined threshold, then the alignment can be considered successful. Conversely, if the cost function score C is above the threshold, it is an indication that some pairs of images do not correspond to the same time. The pairs $p_i$ associated with a high value of $C_i$ are the most likely to correspond to erroneous pairs. Therefore, they are the ones that should be inspected first by a user for validation and/or correction.

It is to be appreciated that other objective functions can be utilized in place of a cost function. The success of the method can rely more on the quality of the pairs rather than on their number. For instance, N−1 pairs of images that correspond exactly to the same instants will give near perfect results.

A further consideration can be related to the identification of true time as it relates to the images for alignment. To this point, multiple sequence alignment has been the sole consideration. However, there is no guarantee that the chosen reference is synchronized with respect to the "true" time. We can estimate the "true time" in the following manner. It is assumed that the reference is shifted with respect to the "true time" by Δ. We can look for Δ which minimizes the average absolute time-shift:

$$\Gamma = \frac{1}{N} \sum_{n=1}^{N} |\delta(n) - \Delta| \qquad (2)$$

We take the absolute (and not the squared) value as it is more robust in the case where the different cameras are grossly desynchronized. As noted above, other objective functions can be considered for the estimation of true time with the methodology 100.

A computer 150 illustrates one possible hardware configuration to support the systems and methods described herein, including the method 100 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 150 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 150 can further include a hard disk drive, a magnetic disk drive, e.g., to read from or write to a removable disk, and an optical disk drive, e.g., for reading a CD-ROM disk or to read from or write to other optical media. The computer 150 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 150 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 150 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 150 via any wireless or hard wire protocol and/or standard.

The computer 150 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
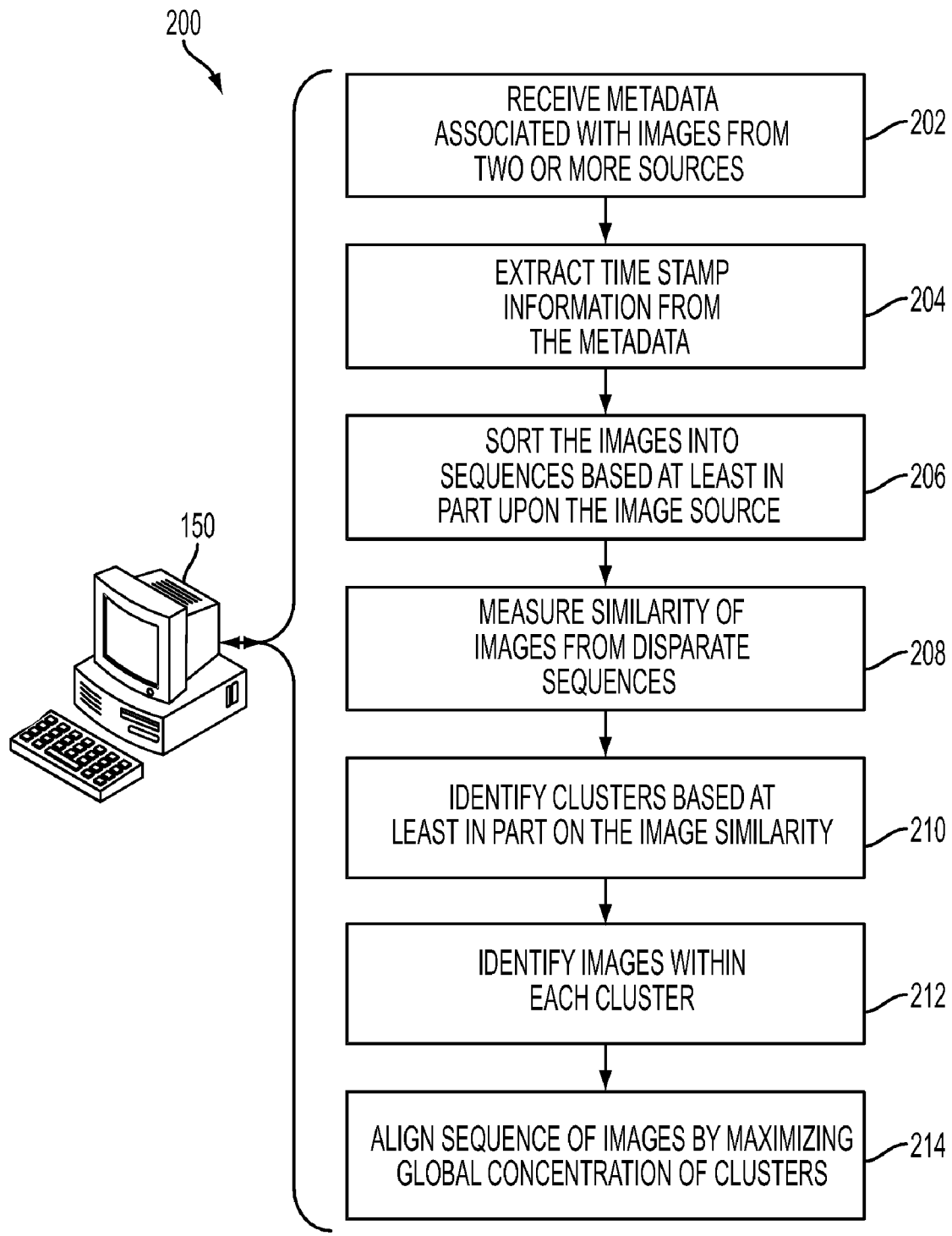
FIG. 2 illustrates a method of aligning a sequence of images by maximizing a global concentration of clusters, in accordance with one aspect of the subject embodiment.

FIG. 2 illustrates a methodology 200 that is utilized to align a sequence of images by maximizing a global concentration of clusters. The methodology 200 is a generalization of the methodology 100 described above wherein image clusters are considered in place of image pairs. Generally speaking, modes (or clusters) are detected in an entire set of images, wherein clusters correspond to dense regions in an image space. Next, the image sequences are aligned by maximizing the global concentration of such clusters.

At reference numeral 202, metadata is received that is associated with images from two or more sources. As noted, the sources can be substantially any image capturing device such as a camera, a cell phone, a personal digital assistant (PDA), etc. At 204, a time stamp is extracted from the metadata (e.g., an Exif header) for each image. At 206, the images are sorted into sequences based at least in part upon the image source. In one example, images from each of five cameras can be associated with each camera that captured the respective image. This process can be based on metadata and/or via a user to organize the images based upon known parameters, such as the camera owner's identity.

At 208, the similarity of images from disparate sequences is measured, as set forth in method 100 above. In some cases, an image may be linked to multiple images in other sequences thus forming a cluster structure. Hence, it may be advantageous to consider clusters of images instead of pairs, as described above. The main assumption in such cases that the existence of "peak events" during an event, (e.g. sub events which last a short period of time and raise a burst of interest such as a penalty kick during a soccer game). Such "peak events" should correspond to modes in the set of images, both in the visual space and in time. Modes (or clusters) can be identified as generally small clusters corresponding to dense regions. An example of small dense clustering can be identified via a Xerox clustering algorithm as set forth under U.S. patent application Ser. No. 12/109,496 entitled "Large Scale Clustering Using Non-Negative Matrix Factorization on Sparse Graphs."

Figure 5:
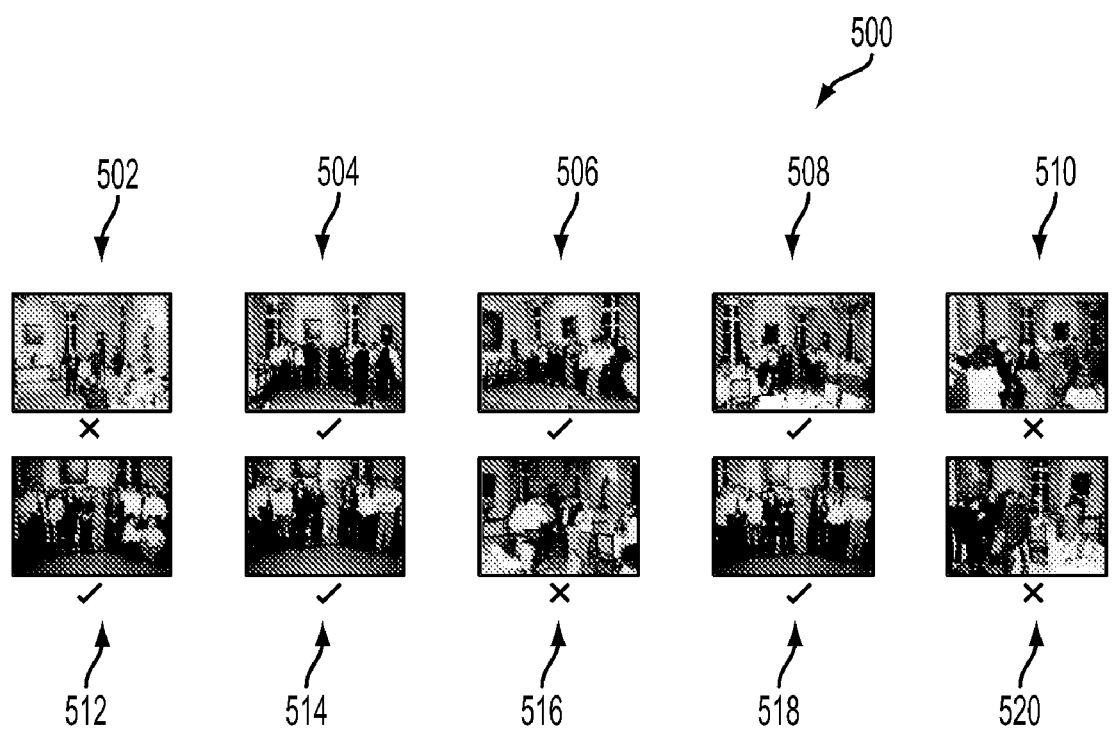
FIG. 5 illustrates an exemplary plurality of images four sequencing, in accordance with an aspect of the subject embodiment.

A group photo, as illustrated in FIG. 5, corresponds to a pick event as specified in the clustering algorithm. The similarity of images can be identified via a suitable measure of similarity such as one described in U.S. patent application Ser. No. 11/947,859 entitled "Adapted Mixture Models for Image Retrieval in Categorization." User interaction can be employed to decide whether the detected modes/clusters correspond to a peak event. For instance, very dense clusters can be identified that contain portraits of various persons taken at various times which do not correspond to a peak event. At 210, images are grouped into the same cluster based at least in part upon image similarity.

At 212, the images within each cluster are identified. Referring back to FIG. 5, a cluster 500 contains ten disparate images. As shown, images 504, 506, 508, 512, 514 and 518 are greater than a predefined threshold and within a cluster. In contrast, images 502, 510, 516 and 520 are not greater than a predetermined similarity threshold and therefore not part of the cluster 500. The time stamp of an image j in a mode i (e.g. mode 500) can be denoted $t_{i,j}$ and the index of the corresponding sequence $S_{i,j}$. As was the case for pairs of images in method 100, a weight $\omega_i$ can be assigned to the cluster i based on the density of the cluster or the fact that it has been validated or not validated by a user.

At 214, a sequence of images is aligned by maximizing a global concentration of clusters. For the alignment, as in the case of pairs of images, a reference sequence is selected wherein a δ variable is associated to the N−1 remaining sequences. Our goal is to minimize the following quadratic objective function (sum of cluster variances):

$$C = \frac{1}{M}\sum_{i=1}^{M}\omega_i C_i \text{ with } C_i = \sum_{j=1}^{M_i}[(t_{i,j} - \delta(s_{i,j})) - \mu_i]^2 \text{ and} \quad (3)$$

$$\mu_i = \frac{1}{M_i}\sum_{j=1}^{M_i}(t_{i,j} - \delta(s_{i,j}))$$

Again, taking partial derivatives and equating them to zero will lead to a system of N−1 equations with N−1 unknowns. Other cost functions $C_i$ can be utilized for such a purpose, such as an entropy based function (e.g. Maximum Entropy, Normalized Entropy, etc.), an exponential index function, a Herfindahl function, a normalized Herfindahl, a Gini coefficient function, or any other concentration coefficient function. If C is below a predefined threshold, then the alignment can be considered successful. On the contrary, if C is greater than a predefined threshold, it means that some images do not correspond to the same time. The "true time" can be estimated utilizing equation 2 as set forth above. In this manner the sequence alignment can be synchronized with respect to a "true time".

Figure 3:
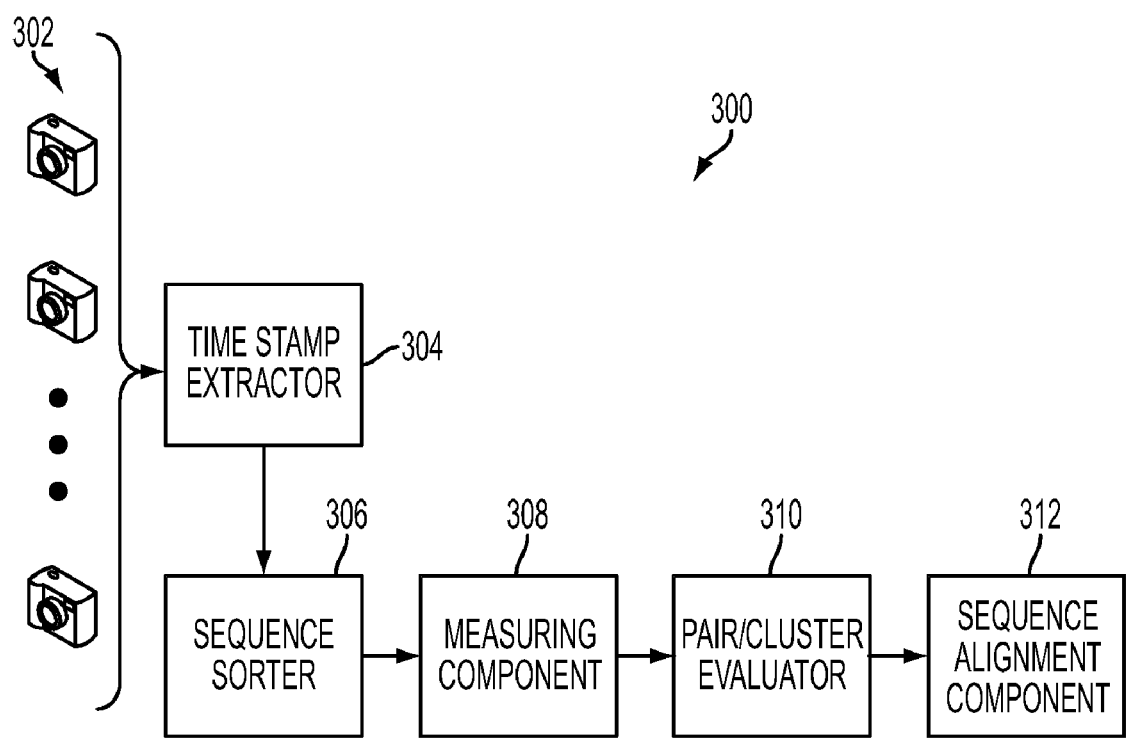
FIG. 3 illustrates a system to align a sequence of images from disparate sources, in accordance with an aspect of the subject embodiment.

FIG. 3 illustrates a system 300 that aligns a sequence of images within a pair or cluster. The system 300 includes a plurality of image source 302 that provide images to a time stamp extractor 304. The image sources can be one or more of a camera, a cell phone, a PDA, or any device capable of capturing an image. The time stamp extractor 304 analyzes the metadata associated with each image from each image source 302 and extracts a time stamp associated with each. In one example, the time stamp extractor reviews the Exif headers and extracts information from an appropriate data/time field contained therein.

A sequence sorter 306 receives the time stamp information from the time stamp extractor 304 and sorts the images into sequences based at least in part upon the image source 302. Metadata can be analyzed to extract information related to the digital image capturing device such as the model, manufacturer, etc. in order to ascertain the image sequencing associated therewith. In addition, the images can be organized based upon known parameters such as an image capturing device owner's identity.

A measuring component 308 measures the similarities of images from disparate sequences. In one example, U.S. patent application Ser. No. 11/947,859 entitled "Adapted Mixture Models for Image Retrieval and Categorization" is utilized. It is to be appreciated that substantially any measurement tool can be employed. A pair cluster evaluator 310 receives information from the measuring component 308 to identify image pairs from disparate sequences with a similarity greater than a predetermined threshold and/or to identify images within a cluster based at least in part upon image similarity. The measuring component 308 can output a similarity score associated with pairs or clusters of images that is utilized to compare to a predetermined threshold to ascertain whether the images have a sufficient similarity.

In one example, let P be the set of pairs: P={$p_i$,i=1 ... M}. There is an assumption that each sequence has at least one image paired with another image in another sequence (which imposes M≧N−1). If a sequence does not follow this requirement, it is not considered in the remainder of the methodology 100. Each pair $p_i$ contains an "image 1" and an "image 2" and is characterized by the time stamps of the images (respectively $t_{i,1}$ and $t_{i,2}$) and the index of corresponding sequences (respectively $S_{i,1}$ and $s_{i,2}$)

Images within each cluster can be identified by the pair cluster evaluator 310 by reviewing images within a cluster such as the cluster 500. It can be assumed that M mode/clusters are identified by the pair cluster evaluator 310 and that a single mode i contains $M_i$ images. A time stamp of an image j and a mode i is denoted $t_{i,j}$ and the index of the corresponding sequence is denoted $s_{i,j}$. Further, a weight can be assigned to each pair or cluster based on the density of the cluster, the similarity of the pair, or the fact that it has been validated or not validated by a user.

A sequence alignment component 312 utilizes an objective function, such as a cost function to determine the appropriate image sequence for the images received from the image capturing devices 302. In one example, a cost function expressed as $$C = \frac{1}{M} \sum_{i=1}^{M} \omega_i C_i \text{ with } C_i = [(t_{i,1} - \delta(s_{i,1})) - (t_{i,2} - \delta(s_{i,2}))]^2 \quad (1)$$

represents an average misalignment of pairs of images. Taking the partial derivatives with respect to $\delta$'s and equating to zero leads to a system of N−1 linear equations with N−1 unknowns. If this system has a unique solution, then a candidate alignment is found. Using the computed $\delta$ values, one can compute the value of the cost function C. If C is below a predefined threshold, then the alignment can be considered successful. If it is above the threshold, it means that some pairs of images do not correspond to the same time. The pairs $p_i$ associated with a high value of $C_i$ are the most likely to correspond to erroneous pairs. Therefore, they are the ones that should be inspected first for validation and/or correction by a user or other means.

In another example a cluster of images requires alignment wherein a reference sequence is selected and a $\Delta$ is associated to the N−1 remaining sequences. The goal is to minimize the following quadratic objective function that includes a sum of cluster variances.

$$C = \frac{1}{M} \sum_{i=1}^{M} \omega_i C_i \text{ with } C_i = \sum_{j=1}^{M_i} [(t_{i,j} - \delta(s_{i,j})) - \mu_i]^2 \text{ and} \quad (3)$$

$$\mu_i = \frac{1}{M_i} \sum_{j=1}^{M_i} (t_{i,j} - \delta(s_{i,j}))$$

The sequence alignment component 312 can utilize substantially objective function such as an entropy based, a maximum entropy based, a normalized entropy, an exponential index, a Herfindahl, a normalized Herfindahl, a Gini coefficient, and/or any concentration coefficient function. Once an appropriate sequence is identified for the images received, it will be output by the sequence alignment component 312.

Figure 4:
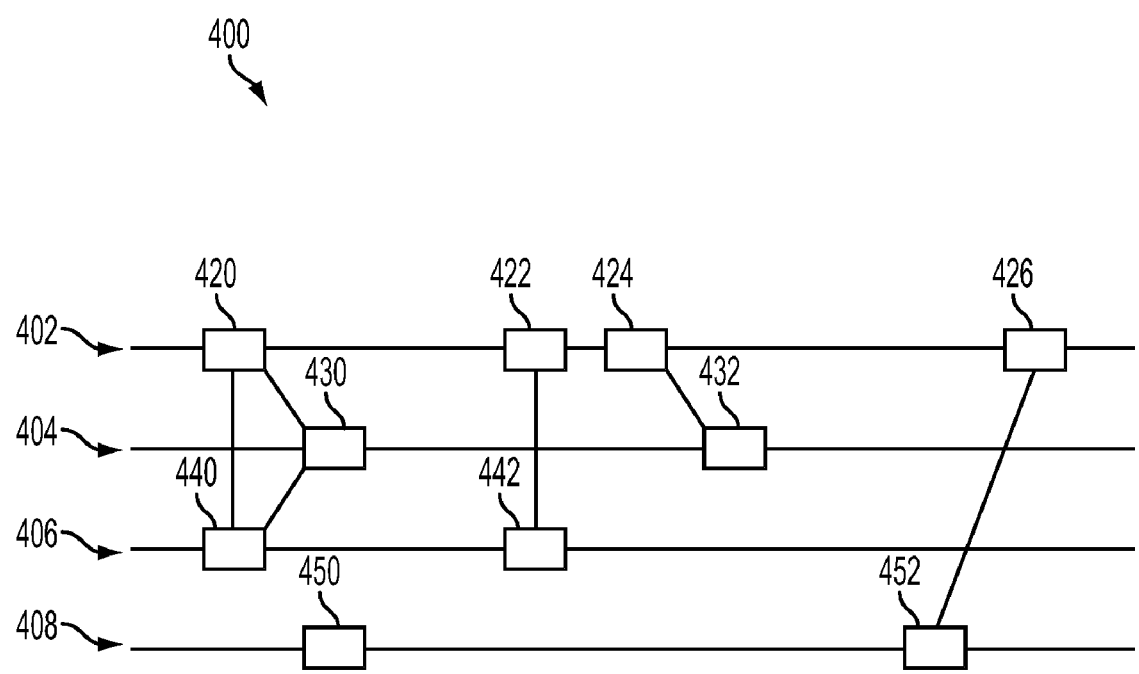
FIG. 4 illustrates an exemplary system with four sequences with a plurality of sequences, in accordance with an aspect of the subject embodiment.

FIG. 4 illustrates a system 400 that includes a plurality of sequences 402, 404, 406 and 408. Each of these sequences is identified by a horizontal bar. The sequence 402 includes images 420, 422, 424 and 426. The sequence 404 includes the images 430 and 432. The sequence 406 includes images 440 and 442. The sequence 408 includes images 450 and 452. It is to be appreciated that the X axis is representative of time as in the time the images were captured within each of the image capturing devices or within each sequence. The lines that connect images from disparate sequences represent a similarity pair or cluster that is utilized for evaluation. In this matter, the sum total of the images 420 to 452 can be aligned in a proper sequence utilizing the similarity information. As shown, images 420, 430 and 440 are within the same cluster as they have a similarity that is greater than a predefined threshold. In addition, images 422 and 442 are paired as are images 424 and 432 and images 426 and 452. The images that are identified within the same pair or cluster can be processed via the system 300 in order to ascertain the appropriate sequence alignment associated therewith.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-based method that aligns sequences of images, comprising:
   receiving metadata associated with images from two or more image sources;
   extracting a time stamp from the metadata;
   sorting the images into sequences based at least in part upon the image sources;
   measuring similarity of images from disparate sequences;
   identifying image pairs from disparate sequences with a similarity greater than a predetermined threshold; and,
   aligning a sequence of images by minimizing a misalignment of time stamps of image pairs by applying a time shift to the time stamps, whereby the images are sequenced by the time the images were captured by the image sources.

2. The method according to claim 1, wherein the metadata is stored in an Exif header.

3. The method according to claim 1, wherein an image of the sequences of images is one of a JPEG, a TIFF, and a RIF Wav format.

4. The method according to claim 1, wherein an interface is utilized to allow a user to validate the image pairs.

5. The method according to claim 1, wherein a confidence measure is assigned to each of the image pairs.

6. The method according to claim 1, wherein aligning images is done with respect to a true time measure.

7. The method according to claim 6, wherein the true time measure is computed utilizing a function:

$$\Gamma = \frac{1}{N} \sum_{n=1}^{N} |\delta(n) - \Delta|$$

wherein $\Gamma$ is the function, N is the number of sequences, $\delta$ is a time shift of sequence n, n from 1 to N, and $\Delta$ is the time-shift of a reference sequence.

8. The method according to claim 1, wherein the misalignment of time stamps of image pairs is minimized via a cost function.

9. The method according to claim 8, wherein the cost function is $$C = \frac{1}{M} \sum_{i=1}^{M} \omega_i C_i \text{ with } C_i = [(t_{i,1} - \delta(s_{i,1})) - (t_{i,2} - \delta(s_{i,2}))]^2$$

wherein C is the cost function, M is the number of image pairs, $\omega$ is a confidence measure which is a function of the similarity of images, $C_i$ is a cost of a particular image pair of images $s_{i,1}$ and $s_{i,2}$, $t_{i,1}$, is the time stamp of an image $s_{i,1}$, $t_{i,2}$ is the time stamp of an image $s_{i,2}$, and δ is the time shift of the time stamp of an image $s_{i,1}$ or $s_{i,2}$.

10. A computer based method that aligns sequences of images, comprising:

receiving metadata associated with images from o or more image sources, the metadata containing time information;

sorting the images into sequences based at least in part upon the image sources;

measuring a visual similarity of mages from disparate sequences;

identifying clusters of images from disparate sequences based at least in part upon the visual similarity of the images;

assigning a confidence measure to each cluster such that a reference cluster having a reference visual similarity is assigned a reference confidence measure, clusters having a visual similarity greater than the reference visual similarity are assigned a confidence measure which is greater than the reference confidence measure, and clusters having a similarity less than the reference visual similarity are assigned a confidence measure which is less than the reference confidence measure; and aligning a sequence of images by maximizing a global concentration of the clusters.

11. The method according to claim 10, further including:

determining if the visual similarity of images from disparate sources is greater than a predetermined threshold; and maximizing the global concentration of clusters by minimizing the sum of cluster variances.

12. The method according to claim 10, wherein maximizing the global concentration of clusters is accomplished via one of a cost function, a maximum entropy function, a normalized entropy function, an exponential Index function, a Herfindahl function, a normalized Herfindahl function, a Gini coefficient function, and a concentration coefficient function.

13. The method according to claim 12, wherein maximizing the global concentration of clusters is accomplished by minimizing a cost function set forth as $$C = \frac{1}{M}\sum_{i=1}^{M} \omega_i C_i \text{ with } C_i = \sum_{j=1}^{M_i} [(t_{i,j} - \delta(s_{i,j})) - \mu_i]^2 \text{ and}$$

-continued $$\mu_i = \frac{1}{M_i}\sum_{j=1}^{M_i}(t_{i,j} - \delta(s_{i,j}))$$

wherein C is the cost function, M is the number of image clusters, $w_i$ is a confidence measure which is a function of the similarity of images, $C_i$ is a cost of a particular image sequence, $t_{i,j}$ is the time stamp of an image $s_{i,j}$, and δ is the time shift of the time stamp of an image $s_{i,j}$, and $\mu_i$ is the mean shifted time stamp of a cluster i of $M_i$ images.

14. The method according to claim 12, wherein the cost function score is compared to a predefined threshold.

15. The method according to claim 10, wherein the metadata is stored in an Exit header.

16. The method according to claim 10, wherein an interface is utilized to allow a user to validate a cluster of images.

17. The method according to claim 10, wherein the reference confidence measure assigned to the reference cluster is 1.

18. The method according to claim 10, wherein aligning the sequence of images is with respect to a true time metric.

19. The method according to claim 18, wherein the true time is determined via a function:

$$\Gamma = \frac{1}{N}\sum_{n=1}^{N} |\delta(n) - \Delta|$$

wherein Γ is the function, N is the number of sequences, δ is a time shift of sequence n, n from 1 to N, and Δ is the time-shift of a reference sequence.

20. A system that aligns a sequence of images comprising:

a plurality of image capturing devices that each capture an image;

a time stamp extractor that extracts a time stamp associated with each image from each of the one or more image capturing devices;

a sequence sorter that sorts the sequence of images associated with each image capturing device;

a measuring component that measures a similarity of each of the images from disparate sequences;

a sequence alignment component that utilizes similarity information to minimize misalignment of images by minimizing one of a misalignment of pairs and a sum of cluster variances to provide a time shift to apply to the time stamp of at least one image to align the sequence.

* * * * *